Aug. 21, 1951 G. E. PARKER 2,565,041
FLUID PRESSURE GOVERNOR
Filed June 1, 1948 2 Sheets-Sheet 1

INVENTOR
George E. Parker
By Carlson, Pitzner Hubbard & Wolfe
ATTORNEYS

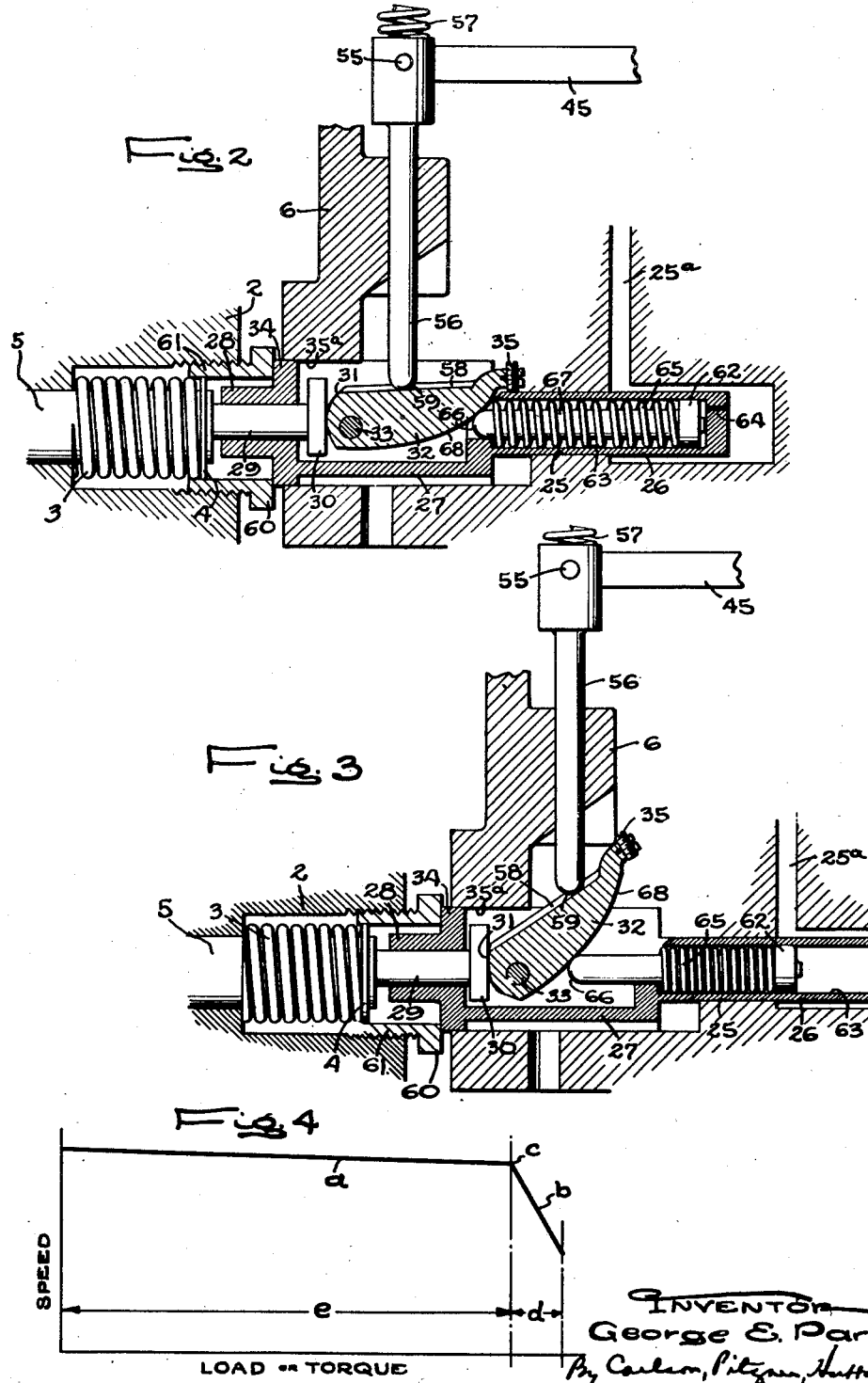

Patented Aug. 21, 1951

2,565,041

UNITED STATES PATENT OFFICE 2,565,041

FLUID PRESSURE GOVERNOR

George E. Parker, Rockford, Ill., assignor to Woodward Governor Company, Rockford, Ill., a corporation of Illinois Application June 1, 1948, Serial No. 30,264

16 Claims. (Cl. 264—14)

This invention relates to a speed responsive governor having a so-called speed droop characteristic for stabilizing the operation of a prime mover controlled by the governor. More particularly, the invention relates to a speed droop governor in which the droop is changed in value in different parts of the governor operating range.

One object is to provide a governor of the above character in which the droop may be changed by a substantial amount in one part of the operating range without danger of causing unstable operation of the controlled prime mover, and without changing the sensitivity of the governor in other parts of the operating range.

A more detailed object is to preclude danger of self-excited oscillations in the governor by automatically adjusting the rate of travel of the governor servo with changes in the amount of droop in the governor.

The invention also resides in the novel manner of changing the speed droop of the governor, and in the means employed to limit the rate of change in the position of the governor servo.

Other objects and advantages of the invention will become apparent from the following detailed description taken in connection with the accompanying drawings, in which Figure 1 is a vertical sectional view of the improved governor expanded to show the main operating parts in a common plane.

Figs. 2 and 3 are fragmentary views showing certain of the parts in different operating positions.

Fig. 4 is a graph of the speed droop characteristic of the governor.

Figure 1:
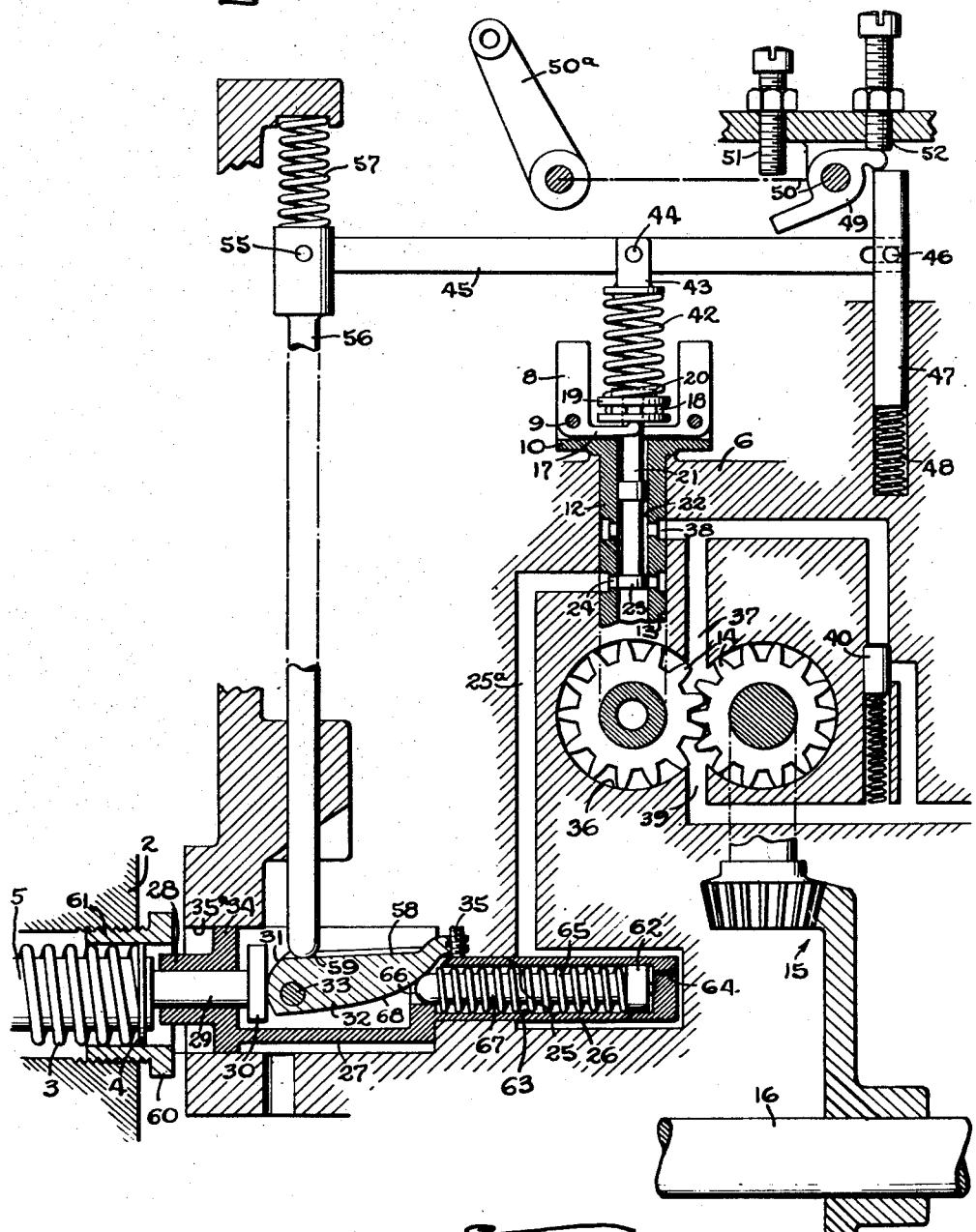

While the invention is susceptible of various modifications and alternative constructions, I have shown in the drawings and will herein describe in detail the preferred embodiment. It is to be understood, however, that I do not intend to limit the invention by such disclosure, but aim to cover all modifications and alternative constructions falling within the spirit and scope of the invention as expressed in the appended claims.

The improved speed droop governor is especially suited for use in imparting to a prime mover a speed droop characteristic $a$ (Fig. 4) of low value, for example 5%, during the normal range of operation of the prime mover controlled by the governor, and a substantially greater droop $b$ above normal full load which is indicated at $c$. Such a further addition of fuel beyond the normal full load limit is made possible particularly in a four cycle Diesel engine by virtue of the increase in volumetric efficiency which accompanies a reduction in speed. By metering this additional fuel accurately in accordance with the speed reduction above full load, the capacity of the prime mover to handle temporary overloads may be increased appreciably.

The governor shown in the drawings for purposes of illustration is intended to detect changes in the speed of a prime mover (not shown) and to correct for such changes by positioning a speed regulating member such as a rod 5 controlling the supply of energy or fuel to the prime mover. Herein, the rod is slidable to the left from the idling position shown in Fig. 1 to progressively increase the fuel supply. A spring 3 acts against a shoulder 4 to urge the rod in the speed decreasing direction.

The speed sensing device and the servo controlled thereby may be housed in a casing indicated generally at 6 and usually mounted on some part 2 of the prime mover housing. While the speed sensing device may take various forms, it is shown herein as comprising upstanding weights or flyballs 8 pivoted on horizontal pins 9 on a head 10 fast on the upper end of a sleeve 12 which is journaled in a vertical bore 13 of the casing 6 with its lower end driven through suitable gears 14 and 15 from a shaft 16 driven by the prime mover.

Arms 17 on the flyballs bear upwardly against the lower race ring of a ball thrust bearing 18 having an upper ring 19 which abuts against a shoulder 20 on a valve rod 21. The latter is slidable in a bore 22 of the sleeve 12 and carries an enlargement or land 23 at its lower end cooperating with sleeve ports 24 of substantially the same diameter as the height of the land. The valve thus formed controls the flow of pressure fluid or oil through a groove around the sleeve to and from a passage 25ᵃ leading to the head end of a cylinder 25 in the casing 6.

A piston 26 reciprocates in this cylinder and cooperates therewith to form a servo motor for variably positioning the throttle rod 5 or other device by which the speed of the prime mover is regulated. For a purpose to appear later, the piston 26 projects outwardly from the cylinder and is formed with a hollow enlargement 27 which constitutes the piston rod and has a flange 34 slidable in a guide 35ᵃ on the casing 6. The end 28 of the piston rod 27 projects beyond the flange 34 and slidably supports a plunger 29, the outer end of which abuts against the end of the fuel rod 5. A head 30 on the inner end bears against a rounded cam surface 31 on a lever 32 fulcrumed on a pin 33 on the piston rod 27. The pin is offset below the point of engagement between the head 30 and the cam 31 so that the force of the servo spring 3 acting through the plunger 29 normally swings the free end of the lever downwardly against the piston 26 to a position determined by a set screw 35. Thus, the enlargement 27, the lever 32, and the plunger 29 normally form a rigid connection between the piston 26 and the throttle rod 5. This connection is, however, longitudinally extensible, for a purpose to appear later, by swinging of the lever 32 upwardly as shown in Fig. 3.

The gears 14 above referred to are mounted in a recess 36 of the casing to form a pump whose outlet delivers pressure fluid to a passage 37 leading through a groove 38 to the interior of the valve sleeve 12 above the control land 23. When the supply line pressure exceeds a predetermined value, for example 200 pounds, fluid is by-passed through a valve 40 to the pump inlet 39 which also communicates with the oil supply line of the prime mover.

The tendency of the flyballs to lift the pilot valve rod 21 is counteracted in the present instance by a resilient means in the form of a coiled compression spring 42 acting between the abutment 20 and a block 43 pivoted at 44 intermediate the ends of a lever 45. A slot in one end of this lever receives a pin 46 on a rod 47 urged in the speed decreasing direction by a spring 48 and bearing at its other end against an arm 49 on a rockshaft 50 journaled in the casing 6. Through a hand lever 50ª, foot pedal, or other suitable mechanism, the rockshaft may be adjusted to any desired position within a range determined by high and low speed stops 51 and 52. Thus, assuming that the other end of the lever 45 is fixed, the stress of the spring 42 and, therefore, the speed setting of the governor will be varied progressively as the shaft 50 is rocked back and forth.

To stabilize the operation of the prime mover, the action of the governor is modified by imparting a speed droop characteristic $a$, this being accomplished herein by changing the stress in the speeder spring 42 with changes in the position of the servo piston 26. To this end, the other end of the lever 45 is pivoted at 55 to one end of a rod 56 guided for endwise movement in the casing 6 and urged in the speed increasing direction by a spring 57. The rounded lower end 59 of the rod bears against a surface 58 at the bottom of a groove on the top of the lever 32 above referred to. The surface 58 is shaped according to the curvature desired in the speed droop $a$ (Fig. 4), being straight in the present instance and inclined upwardly from the low point which is engaged by the follower end 59 when the servo piston is retracted to idling position as shown in Fig. 1. By adjusting the set screw 35, it will be apparent that the inclination of the surface 58 relative to the line of travel of the servo piston 26 may be varied as desired and the slope of the speed droop $a$ changed correspondingly.

To increase the speed droop substantially as indicated at $b$ (Fig. 4), provision is made for increasing the ratio of motion transmission between the fuel rod 5 and the lever 45 when the full load point $c$ has been reached. Herein, the latter point is determined by engagement of the flange 34 on the servo piston 26 with a stop 60 formed by a bushing 61 encircling the end of the fuel rod 5 and screwed into the fuel rod housing 2 so that the full load point may be adjusted.

With the main servo piston 25 thus blocked as shown in Fig. 2, further movement of the fuel rod is effected by an auxiliary piston 62 slidable in a cylinder 63 which is formed within the main piston 26 and communicates at its head end with the main cylinder 25 through a passage 64. The piston 62 is urged by a coiled compression spring 65 toward the head end of the cylinder (see Fig. 1) where it is held during operation of the prime mover below full load. To this end, the spring 65 is scaled to overcome the pressure normally developed in the main and auxiliary cylinders below the full load position of the fuel rod.

After the stop 60 is encountered by the servo piston 26, a further pressure build up in the servo supply line 25ª and, therefore, in the auxiliary cylinder 63 will eventually overcome the spring 65 and move the piston 62 relative to the main servo piston 26 and project the rounded end 66 of the rod 67 thereof against an inclined cam surface 68 on the under side of the lever 32 near the free end of the lever. As this movement progresses (see Fig. 3), the follower rod 56 will be raised by the lever. Since the latter now engages the surface 58 well to the right of the lever fulcrum 33, the resulting movement imparted to the lever 45 for a given movement of the auxiliary piston 62 will be substantially greater than the movement caused by the cam 58 for the same movement of the main piston 26. As a result, the amount of speed droop will be increased abruptly as indicated at $b$ in the high torque portion of the operating range of the prime mover.

The movement of the auxiliary piston 62 is also communicated to the fuel rod 5 to increase the fuel supply by amounts capable of being consumed by the prime mover at the reduced speeds resulting from overloading. This is effected by the surface 31 on the lever 32 which surface acts on the follower 30 during upward swinging of the lever 32 to cam the plunger 29 forwardly and thus move the fuel rod 5 to increase the fuel supply beyond the amount determined by the stop 60. By varying the rise of surface 31, it will be apparent that the ratio of motion transmission between the auxiliary piston 62 and the fuel rod may be changed as desired thereby enabling fuel delivery in the overload range to be varied.

Where, as in the governor described above, speed droop is produced by adjusting the speeder spring 42 with changes in the servo position, there is danger, due to flyball inertia, etc. of inducing in the flyball system self-excited oscillations of such magnitude as to result in unstable operation of the prime mover. Such a condition is apt to arise where it is desirable, as in the present instance, to provide for such a substantial increase in the speed droop at $b$. To preclude the possibility of such unstable operation, the present invention provides for slowing down the speed of movement of the servo in the high droop range for a given displacement of the pilot valve. This may be accomplished in various ways, as for example by making the effective area of the auxiliary piston 62 larger than that of the main piston 26. In the present instance, however, it is achieved by restricting the flow of pressure fluid from the supply passage 25ª to the auxiliary servo cylinder 63. To this end, the passage 64 through the head of the piston 26 is of substantial length and of relatively small diameter, for example .015 of an inch, which will, of course, vary with the various factors including the pressure fluid being used, the coefficients of the control valve, the flyball characteristics, etc. Since the auxiliary servo is carried by and moves with the main servo, and the restriction 64 is located on the main piston 23, the latter will become effective only after the main piston is blocked and the controlled fluid pressure builds up sufficiently to overcome the spring 65.

*Operation*

At equilibrium under normal load conditions, the parts will be positioned as shown in Fig. 1, and the throttle rod 5 will be disposed in a position corresponding to the prime mover speed selected by the prevailing position of the adjusting rockshaft 50.

If the load on the engine increases resulting in a decrease in speed, the flyballs 8 will move inwardly dropping the pilot valve land 23 below the ports 24 so as to admit pressure fluid to the main servo piston 26. The latter, together with the plunger 29, is moved to the left (Fig. 1) against the action of the spring 3 to shift the rod 5 and increase the throttle opening. In this motion, the follower rod 56 rides up the cam incline 58 and swings the lever 45 to decrease the stress of the speeder spring 42 and thereby establish equilibrium at a lower engine speed down the curve *a*. This droop in the engine speed from no load to full load may be 5 per cent for example.

The reverse action takes place when the load decreases and the engine speed increases above the selected value. In response to this, the land 23 is raised permitting oil to drain from the cylinder 25 allowing the piston 26 to move to the right as viewed in Fig. 1 so as to decrease the fuel supply until the accompanying downward swinging of the speed droop lever 45 has increased the speeder spring stress to establish equilibrium under the new load. During such operation under normal load conditions, the pressure in the main servo cylinder 25 varies from 50 to 75 p. s. i., for example, and is insufficient to move the auxiliary servo piston 62 within the cylinder 63. The lever 32 thus remains in the position shown in Fig. 1, the speed droop remaining fixed as indicated by the line *a*.

At full load, indicated at *c*, the flange 34 of the main piston rod will have reached the stop 60 and become blocked against further fuel increasing movement. This condition is illustrated in Fig. 2.

When an abnormal load greater than full load is encountered, the engine speed will fall from the point *c*, and the resulting opening of the control valve will cause a further pressure build-up in the supply passage 25ª above the 75 p. s. i. required to maintain the main piston 26 against the stop 60. At 90 p. s. i., the spring 65 is overcome and the auxiliary piston 62 moves to swing the lever 32 upwardly during which the cam 31 advances the plunger 29 to increase the fuel supply slowly. At the same time, the lever 32 raises the follower rod 56 with a considerably increased ratio of motion transmission thus causing the engine speed to droop sharply along the curve *b*. As a result, the small increase in fuel supply which takes place over the entire overload range *d* (usually about $\frac{1}{5}$ of the normal operating range *e*) is proportioned accurately in accordance with the decrease in speed over a substantial range, for example 1000 R. P. M. droop from no load to full load. Swinging of the lever 32 may be limited by closing of the spring coil 65 or by other stop.

As a result of the abrupt change in the speed droop curve beyond full load, additional fuel may be supplied to the engine which, due to its increased volumetric efficiency at reduced speeds, is capable of handling temporary overloads and this without danger of smoking. The latter is attributable to the accurate metering of the added fuel supply achieved by the high droop produced in the overload range. At the same time, the danger of exciting false oscillations in the governor and resulting instability of engine operation is avoided through the action of the restriction 64 above described in slowing down the speed of the piston 62 in the overload range *d*. It will be observed that this action is selective and does not affect the rate of travel of the fuel rod in the normal operating range *e*.

I claim as my invention:

1. In a speed governor, the combination of, a speed sensing device, a fluid filled cylinder, a valve actuated by said device and controlling the flow of pressure fluid to and from said cylinder to increase and decrease the pressure therein as the speed detected by said device respectively falls below and rises above a predetermined value, a main piston slidable in said cylinder, a stop limiting the movement of said piston to a predetermined position as the pressure in said cylinder increases to a predetermined value, an auxiliary cylinder formed within said main piston and communicating with the latter, a piston in said auxiliary cylinder spring loaded against movement at pressures below said predetermined value, a lever on said main piston fulcrumed to swing about an axis extending transversely of the piston in response to movement of said auxiliary piston relative to the first piston, an element movable to vary the speed setting of said device and thereby impart speed droop to said governor, a rising cam surface on said lever extending longitudinally of said pistons, and a follower for said cam surface connected to said element to actuate the same and moved progressively in one direction in the movement of said first piston toward said stop and in the subsequent swinging of said lever by said auxiliary piston.

2. In a speed governor, the combination of, a fluid filled cylinder, a speed responsive valve regulating the fluid pressure in said cylinder, a main piston slidable in said cylinder, a stop limiting the movement of said piston to a predetermined position as the pressure in said cylinder increases to a predetermined value, an auxiliary cylinder formed within said main piston and communicating with the latter, a piston in said auxiliary cylinder loaded against movement at pressures below said predetermined value, a lever on said main piston fulcrumed to swing about an axis extending transversely of the piston in response to movement of said auxiliary piston relative to the first piston, an element movable to impart speed droop to said governor, and mechanism for transmitting to said element the reciprocatory movements of said first piston and the swinging movements of said lever.

3. In a speed governor, the combination of, a fluid filled cylinder, a speed responsive valve controlling the flow of pressure fluid to and from said cylinder to increase and decrease the pressure therein as the detected speed respectively falls below and rises above a predetermined value, a main piston slidable in said cylinder, a stop limiting the movement of said piston to a predetermined position as the pressure in said cylinder increases to a predetermined value, an auxiliary cylinder formed within said main piston and communicating with the latter, a piston in said auxiliary cylinder spring loaded against movement at pressures below said predetermined value, a member mounted on said main piston and moved relative thereto by said auxiliary piston, an element movable to impart speed droop to the governor, and mechanism actuated successively by the movements of said first piston and said member to move said element progressively at one rate during movement of said first piston and at an increased rate during movement of said auxiliary piston.

4. In a speed governor, the combination of, a speed sensing device, a fluid filled cylinder, a valve actuated by said device and controlling the flow of pressure fluid to and from said cylinder to increase and decrease the pressure therein as the speed detected by said device respectively falls below and rises above a predetermined value, a main piston slidable in said cylinder, a stop limiting the movement of said piston to a predetermined position as the pressure in said cylinder increases to a predetermined value, an auxiliary cylinder formed within said main piston and communicating with the latter, a piston in said auxiliary cylinder loaded against movement at pressures below said predetermined value, an element movable to vary the speed setting of said device and thereby impart speed droop to said governor, and mechanism for transmitting the movements of said first piston to said element at one rate and the movements of said auxiliary piston to the element at a greater rate.

5. In a speed governor, the combination of, a fluid filled cylinder having a piston therein movable in response to pressure changes in the cylinder within a predetermined range, a second fluid filled cylinder communicating with said first cylinder and having a piston therein movable in response to pressure changes above said range, a speed responsive valve regulating the flow of pressure fluid to and from said cylinders, a member actuated successively by said pistons and adapted for connection with the regulator of a prime mover, an element variably movable to impart speed droop to said governor, and mechanism for transmitting the successive motions of said first and second pistons to said element at different speed ratios.

6. In a speed governor, the combination of, a member adapted for connection to the speed regulator of a prime mover and movable back and forth, a main servo for moving said member according to fluid pressure changes in a fluid filled chamber, a speed sensing device, a valve actuated thereby to vary the fluid pressure in said chamber with deviations in speed from the setting of said device, a stop operable to limit the movement of said main servo to a predetermined position as the pressure in said chamber increases, an auxiliary fluid servo responsive to the pressure build-up in said chamber after engagement of said stop by said main servo and operable to move said member beyond the position determined by said stop, an element movable to vary the setting of said speed sensing device to impart speed droop to said governor, and mechanism for transmitting to said element the motion of said main servo at one ratio and the motion of said auxiliary servo at a higher ratio.

7. In a speed governor, the combination of, a member adapted for connection to the speed regulator of a prime mover and movable back and forth, a main servo for moving said member, a speed sensing device for varying the energization of said servo with speed deviations from a predetermined value, a stop operable to limit the movement of said main servo to a predetermined position, an auxiliary servo activated by the further energization of said main servo following engagement of said stop and operable to move said member beyond the position determined by said stop, an element variably movable to impart speed droop to said governor, and mechanism for transmitting to said element the motion of said main servo at one ratio and the motion of said auxiliary servo at a higher ratio.

8. In a prime mover control, the combination of, a fluid filled cylinder having a piston therein movable in response to pressure changes in the cylinder within a predetermined range, a second fluid filled cylinder communicating with said first cylinder and having a piston therein movable in response to pressure changes above said range, a speed governor admitting pressure fluid to and releasing the same from said cylinders, a member actuated successively by said pistons and adapted for connection with the regulator of a prime mover, mechanism for modifying the action of the governor so as to stabilize the operation of said prime mover, and means for transmitting the successive motions of said first and second pistons to said mechanism at different speed ratios.

9. The combination of, a member adapted for connection to the speed regulator of a prime mover and movable back and forth through an operating range between high and low torque positions, a fluid filled chamber, a governor adapted to be driven by said prime mover and controlling the flow of pressure fluid to said chamber to increase and decrease the pressure as the governor speed decreases and increases respectively, an element movable back and forth to change the speed setting of said governor, said member comprising one device movable back and forth with changes in said chamber pressure and a second device carried by the first device and movable back and forth relative thereto with pressure changes in said chamber above a value normally operable to move said first device, a stop limiting the movement of said first device to a predetermined position short of said high torque position, mechanism transmitting the motion of said member to said element at one ratio during movement of said first device and at a higher ratio during movement of said second device following engagement of said stop by said first device whereby to increase the speed droop of said governor in the high torque position of said operating range, and a restriction interposed in the path of flow of pressure fluid to said second device to limit the speed of the motion of the latter relative to said first device.

10. In a speed governor, the combination of, a fluid filled cylinder having a piston therein movable in response to pressure changes in the cylinder within a predetermined range, a second fluid filled cylinder having a piston therein movable in response to pressure changes above said range, fluid passages leading to the respective cylinders, a speed responsive valve admitting pressure fluid to and releasing the same from said cylinders through both of said passages, a member actuated successively by said pistons and adapted for connection with the regulator of a prime mover, an element variably movable to impart speed droop to said governor, and mechanism for transmitting the successive motions of said first and second pistons to said element at low and high speed ratios respectively, said passage leading to said second cylinder including a restriction operable to throttle the rate of fluid flow to the second cylinder whereby to cause movement of said second piston at a slower speed than the first piston.

11. In a speed governor, the combination of, a fluid servo, a second fluid servo, a speed responsive valve admitting pressure fluid to and releasing the same from both of said servos, a member actuated successively by said servos and adapted for connection with the regulator of a prime mover, an element variably movable to impart speed droop to said governor, mechanism for transmitting the successive motions of said first and second servos to said element at different speed ratios, and means for restricting the rate of fluid flow to said second servo and thereby cause said member to be actuated by the servo at a speed less than the speed of actuation thereof by said first servo.

12. In a speed governor, the combination of, a fluid servo movable in response to pressure changes within a predetermined range, a second fluid servo responsive only to pressure changes within a higher range, a speed responsive valve admitting pressure fluid to and releasing the same from both of said servos, a stop limiting the motion of said first servo, a member actuated by said servos and adapted for connection with the regulator of a prime mover, an element variably movable to modify the action of said valve and impart speed droop to said governor, mechanism for transmitting the motion of said first servo to said element at one rate and the motion of said second servo to the element at a different rate, and means for restricting the rate of fluid flow to said second servo.

13. In a speed governor, the combination of, a fluid servo movable in response to pressure changes within a predetermined range, a second fluid servo responsive only to pressure changes within a higher range, means including a speed responsive valve regulating the flow of pressure fluid at one rate to said first servo and at a different rate to said second servo whereby to vary the speeds of movement thereof, an element variably movable to modify the action of said valve and impart speed droop to said governor, and mechanism for transmitting the motion of said first servo to said element at one rate and the motion of the second servo to the element at a lesser rate.

14. In a speed governor, the combination of, a fluid servo movable in response to pressure changes within a predetermined range, a second fluid servo responsive only to pressure changes within a higher range, means including a speed responsive valve regulating the flow of pressure fluid to cause movement of said first servo at one rate and movement of the second servo at a substantially lesser rate, an element variably movable to modify the action of said valve and impart speed droop to said governor, and mechanism for transmitting the motion of said first servo to said element at one rate and the motion of the second servo to the element at a lesser rate.

15. The combination of, a member adapted to actuate the speed regulator of a prime mover and movable back and forth through an operating range between high and low torque positions, a governor adapted to be driven by the prime mover and operable to position said member within said range in accordance with detected speed changes, an element movable back and forth to impart speed droop to said governor, mechanism connecting said member and said element for transmitting the motion of the member to the element, said mechanism including an auxiliary device normally inactive throughout the low torque portion of said range and actuated by said member only in the high torque portion of the range to increase the ratio of motion transmission from said member to said element and thereby increase said speed droop, and mechanism rendered active in the high torque portion of said range to reduce the speed of actuation of said member.

16. The combination of, a member movable back and forth to regulate the speed of a prime mover, two servo actuators operable successively to move said member, a speed governor controlling the energization of said servos and operable to cause movement of said member in response to detected speed changes, two mechanisms operable by the motions of said actuators to impart low and high speed droop to said governor, and means operable automatically to slow down the speed of actuation of the high droop mechanism by its servo actuator.

GEORGE E. PARKER.

REFERENCES CITED

The following references are of record in the file of this patent:

UNITED STATES PATENTS

| Number | Name | Date |
|---|---|---|
| 1,234,882 | Doble | July 31, 1917 |
| 1,533,767 | Schmidt | Apr. 14, 1925 |
| 1,564,688 | Kimball | Dec. 8, 1925 |
| 2,018,977 | Spellman | Oct. 29, 1935 |

FOREIGN PATENTS

| Number | Country | Date |
|---|---|---|
| 242,638 | Germany | Jan. 15, 1912 |
| 479,434 | France | Jan. 4, 1916 |
| 521,784 | Great Britain | May 30, 1940 |